3,155,731
ALKENYL PENTABORANE(9) AND METHOD FOR ITS PREPARATION
John E. Paustian, Whippany, N.J., and David M. Gardner, Abington, Pa., assignors to Thiokol Chemical Corporation, Trenton, N.J., a corporation of Delaware
No Drawing. Filed July 29, 1958, Ser. No. 751,803
8 Claims. (Cl. 260—606.5)

This invention relates to organoboron compounds which are useful as fuels. The organoboron compounds are prepared by the alkenylation of pentaborane(9) with the lower alkynes employing an alumina catalyst. The liquid products produced in accordance with the method of this invention can be used as fuels when burned with air, for example, in gas turbines such as jet engines. The solid polymeric products produced in accordance with the method of this invention can be incorporated with suitable oxidizers to yield solid propellants generally suitable for rocket power plants and other jet propelled devices.

Pentaborane(9) may be prepared by methods which are described in the art; it is a colorless liquid which melts at −46.8° C. The boron hydrides, and pentaborane(9) in particular, because of their high heats of combustion have been recognized as materials which are potentially of value as high energy fuels. The burning of these materials with oxygen liberates considerably more energy than the oxidation of the corresponding amount of hydrocarbon, producing a very high flame temperature. Pentaborane(9), however, has certain properties which militate against its use as a high energy fuel: (1) it has a very disagreeable odor; (2) it has a relatively high vapor pressure, i.e., 66 mm. of mercury at 0° C., and a boiling point at atmospheric pressure of 58° C.; and (3) its vapors are highly toxic.

One of the objects of this invention is to provide high energy liquid products less volatile and less toxic than pentaborane(9) but at the same time approaching pentaborane(9) in heat of combustion. Another object of this invention is to provide high energy solid products from pentaborane(9). Thus in accordance with the present invention alkyne hydrocarbons are reacted with pentaborane(9) in the presence of an activated alumina catalyst. The presence of the activated alumina catalyst reduces the time, temperature, and pressure necessary for the reaction to proceed satisfactorily and increases the yield of the desired compound.

Suitable alkyne hydrocarbons are those hydrocarbons having from 2 to 4 carbon atoms such as ethyne (acetylene), propyne (methylacetylene), 1-butyne (ethylacetylene) and 2-butyne (dimethylacetylene).

The activated alumina catalyst is preferably finely divided and can have supported thereon one or more metal oxides such as chromia or molybdena. Other suitable catalysts are silica-alumina, silica-magnesia, magnesia-alumina and molybdena.

The molar ratio of alkyne hydrocarbon to pentaborane(9) introduced into the reaction system is generally within the range from 1:5 to 5:1. The reaction advantageously is carried out in the presence of hydrogen and the molar ratio of hydrogen to pentaborane(9) is generally within the range from 2 to 1:1. The reaction temperature can vary from about 150° C. to about 450° C., the reaction pressure can vary from atmospheric to 500 p.s.i.g. or higher, and the reaction time is generally from ¼ to 24 hours.

At pressures near atmospheric, the reaction is slow below about 200° C. but at higher pressures it proceeds fairly rapidly at lower temperatures. Furthermore, where reaction conditions are less severe, liquid products are formed but where reaction conditions are more severe and reaction times are longer, solid polymeric products are formed. Moreover the liquid products can be further reacted to produce the solid polymeric products.

The following examples illustrate embodiments falling within the scope of the invention which is not to be limited thereby.

*Example I*

This experiment was conducted in a cyclic flow system which consisted of a bellows pump, product receiver traps, storage bulb, manometer and a heated reactor tube which contained catalyst. Reaction was in gas phase and the recirculation of the reactant mixture through all components of the apparatus was continuous. The reactor was composed of a jacketed (1″ I.D.) Pyrex glass tube heated electrically. Temperature control was accomplished by means of an indicating pyrometer-controller which was activated by a thermocouple attached to the reactor tube. Temperatures in the reaction zone were measured by means of a thermocouple extending into the catalyst bed. The cyclic flow system was connected to a glass vacuum line having traps maintained at −67° C., −112° C. and −196° C. for product isolation and purification.

The reaction tube was charged with 100 grams of relatively finely divided alumina previously activated by heating for 3 hours at 400–450° C. in an electric furnace. The system was then evacuated and 4.41 grams of pentaborane(9), propyne and hydrogen were introduced into the system in molar ratios respectively of 1:1:2. Sufficient propyne was added during the reaction to maintain the 1:1 ratio. The gases were then circulated through the system by means of a bellows pump, and the reactor heated to a temperature of 200–220° C. for 120 to 260 minutes. At about 200° C. a liquid product was collected in the −67° C. trap. The apparatus was then cooled down and the contents of the traps analyzed by infrared and wet chemical analysis. 0.50 gram of isopropenyl pentaborane(9) was recovered in the −67° C. trap for a 16 percent yield. 1.99 grams of pentaborane(9) reacted. The unreacted pentaborane(9) was collected in the −112° C. trap and the unreacted propyne was collected in the −196° C. trap.

*Example II*

This experiment was conducted using an autoclave as the reactor. A stainless steel autoclave of 110 ml. capacity was charged with 8 grams of relatively finely divided alumina previously activated by heating for 3 hours at 400–450° C. in an electric furnace. In an atmosphere of nitrogen, 13.4 grams of pentaborane(9) was added and the vessel was closed. Propyne and hydrogen were then admitted in a molar ratio of 1:1 and 1:1 respectively with respect to the pentaborane(9). The autoclave was then heated at 160°–165° C. for 6 hours during which the pressure rose to about 500 p.s.i.g. After cooling, the vessel was vented through traps and opened. 3.5 grams of a solid product having some elastic character was removed from the autoclave. Analysis of the solid product by infrared spectrometry indicated it to be a polymer of isopropenylpentaborane(9).

The boron-containing solid material produced by the method of this invention can be employed as an ingredient of solid propellant compositions in accordance with general procedures which are well-understood in the art, inasmuch as it is readily oxidized using conventional solid oxidizers, such as ammonium perchlorate, potassium perchlorate, sodium perchlorate, lithium perchlorate, aluminum perchlorate, ammonium nitrate and the like. In formulating a solid propellant composition employing the solid material produced in accordance with the present invention, generally from 10 to 35 parts by weight of the solid material and from 65 to 90 parts by weight of oxidizer, such as ammonium perchlorate, are present in the final propellant composition. In the propellant, the oxidizer and the solid material of the present process are formulated in intimate admixture with each other, as by finely subdividing each of the materials separately and thereafter intimately admixing them. The purpose in doing this, as the art is aware, is to provide proper burning characteristics in the final propellant. In addition to the oxidizer and the oxidizable organoboron solid material, the final propellant can also contain an artificial resin, generally of the urea-formaldehyde or phenol-formaldehyde type, the function of the resin being to give the propellant mechanical strength and at the same time improve its burning characteristics. Thus, in manufacturing a suitable propellant, proper proportions of finely divided oxidizer and finely divided boron-containing material can be admixed with a high solids content solution of a partially condensed urea-formaldehyde or phenol-formaldehyde resin, the proportions being such that the amount of the resin is about 5 to 10 percent by weight, based upon the weight of the oxidizer and boron compound. The ingredients are thoroughly mixed with simultaneous removal of the solvent, and following this the solvent-free mixture is molded into the desired shape, as by extrusion. Thereafter, the resin can be cured by resorting to heating at moderate temperatures. For further information concerning the formulation of solid propellant compositions, reference is made to U.S. Patent No. 2,622,277 to Bonnell et al. and U.S. Patent No. 2,646,596 to Thomas et al.

The liquid materials produced by the method of this invention can be employed as a fuel when burned with air. Thus they can be used as a fuel in basic and auxiliary combustion systems in gas turbines, particularly aircraft gas turbines of the turbojet or turboprop type. Each of these types is a device in which air is compressed and fuel is then burned in a combustor in admixture with the air. Following this, the products of combustion are expanded through a gas turbine. The liquid materials of this invention can be used as a fuel in the combustors of aircraft gas turbines of the type just described.

Thus, when used as the fuel supplied to the combustor of an aircraft gas turbine engine, the liquid material is employed in essentially the same manner as the hydrocarbon fuels presently being used. The fuel is injected into the combustor in such manner that there is established a local zone where the relative amounts of fuel and air are approximately stoichiometric so that combustion of the fuel can be reliably initiated by means of an electrical spark or some similar means. After this has been done, additional air is introduced into the combustor in order to cool sufficiently the products of combustion before they enter the turbine so that they do not damage the turbine.

We claim:
1. A method for the preparation of alkenyl pentaborane(9) which comprises reacting pentaborane(9) with an alkyne hydrocarbon having from 2 to 4 carbon atoms in the presence of activated alumina at a temperature of about 150° C. to about 450° C. and a pressure of atmospheric to about 500 p.s.i.g.
2. The method of claim 1 in which the reaction is carried out in the presence of hydrogen.
3. The method of claim 2 in which the alkyne hydrocarbon is propyne.
4. The method of claim 3 in which the molar ratio of propyne to pentaborane(9) to hydrogen is 1:1:2.
5. Isopropenyl pentaborane(9).
6. Solid polymeric isopropenyl pentaborane(9).
7. Alkenyl pentaborane(9) wherein the alkenyl radical contains from 2 to 4 carbon atoms.
8. Alkenyl pentaborane(9) wherein the alkenyl radical contains from 2 to 4 carbon atoms selected from the class consisting of monomeric and polymeric alkenyl pentaborane(9).

No references cited.